United States Patent [19]
Morey

[11] 3,894,532
[45] July 15, 1975

[54] INSTRUMENTS FOR TRANSCUTANEOUS AND SUBCUTANEOUS INVESTIGATION AND TREATMENT

[75] Inventor: Robert Earl Morey, Lawrenceville, N.J.

[73] Assignee: Acupulse, Inc., Lawrenceville, N.J.

[22] Filed: Jan. 17, 1974

[21] Appl. No.: 433,986

[52] U.S. Cl. ............ 128/2.1 Z; 128/2.1 C; 128/422
[51] Int. Cl. ............................................. A61b 5/05
[58] Field of Search .......... 128/2.1 C, 2.1 R, 2.1 Z, 128/2.1 M, 303.14, 419 R, 420, 422; 307/235 R

[56] References Cited
UNITED STATES PATENTS

| | | | |
|---|---|---|---|
| 2,716,979 | 9/1955 | Pouret | 128/2.1 C |
| 2,827,041 | 3/1958 | Pierson | 128/2.1 R |
| 2,838,672 | 6/1958 | Paust | 128/422 |
| 3,064,641 | 11/1962 | Manenti et al | 128/2.1 R |
| 3,478,744 | 11/1969 | Leiter | 128/303.14 |
| 3,565,080 | 2/1971 | Ide et al. | 128/2.1 R |
| 3,648,686 | 3/1972 | Payne | 128/2.1 Z |
| 3,727,604 | 4/1973 | Sidwell et al. | 128/2.1 Z |
| 3,772,593 | 11/1973 | Sidhu | 128/2.1 Z |

Primary Examiner—William E. Kamm
Attorney, Agent, or Firm—Philip G. Cooper

[57] ABSTRACT

Instrument provides three modes of operation: (1) An impedance measuring probe and meter and a tone generator, the frequency of which is a function of the skin impedance at the test point. A squelch circuit disables the tone generator when the probe is not in contact with the skin; (2) A sensitive voltage measuring meter can then be switched on using the same indicator. The polarity of the voltage at the probe is indicated by differently colored lights; (3) A voltage generator can then be switched on to provide bursts of electrical energy to the test point. Multiple electrodes are also provided.

4 Claims, 5 Drawing Figures

INSTRUMENTS FOR TRANSCUTANEOUS AND SUBCUTANEOUS INVESTIGATION AND TREATMENT

BACKGROUND OF THE INVENTION

The invention relates to instruments for investigating the electrical characteristics, such as impedance and voltage, at various points on the surface of the human skin and for producing various curative and anesthetic effects on the human body by the application of pulses of electrical energy at selected points.

In the practice of the ancient Chinese art of Acupuncture, it is known that electrical voltages are sometimes applied between two or more of the needles. See, for example, "Proceedings of the NIH Acupuncture Research Conference" of Feb. 28 and Mar. 1, 1973, DHEW Publication No. (NIH) 74-165. Electronic Pulsating Stimulators developed by the Chinese for this purpose are described on page 112 of that publication. Furthermore, investigations have been made by a number of workers in this field of the relationship between the classical acupuncture points and locations of low impedance which have been discovered by measuring skin resistance with an exploring electrode. See pages 121 and 122 of the NIH publication. Finally, studies have been made of the polarity and amplitude of potential response at the so-called acupuncture points, and other points, by means of sensitive indicator and a hand-held silver electrode. See page 124 of the NIH publication. In order to continue such studies and investigations, a more suitable composite instrument is needed which will allow a wide range of studies to be made and which is also capable of producing electrical pulses which may be used to treat specific problems.

SUMMARY

It is, therefore, an object of this invention to provide an improved instrument for conducting such tests and treatments which will provide the researcher or attending physician with the facility of selecting between various modes of measurement or with a wide range of wave-forms. Once a desired spot has been located, the probe should not be moved from the selected spot or changed in any way. The invention also provides an audible indication of the impedance of the point under test so that the operator can find the point of minimum impedance by listening for the minimum or maximum frequency of a tone that is produced. A squelch circuit is also provided which disables the tone generator whenever the probe is removed from the surface of the patient. For ease of interpretation, colored lights are provided to indicate the polarity of any voltage appearing at the point in question during such tests.

BRIEF DESCRIPTION OF THE DRAWINGS

Referring now to the Drawings.

DESCRIPTION OF THE PREFERRED EMBODIMENT

Figure 1:
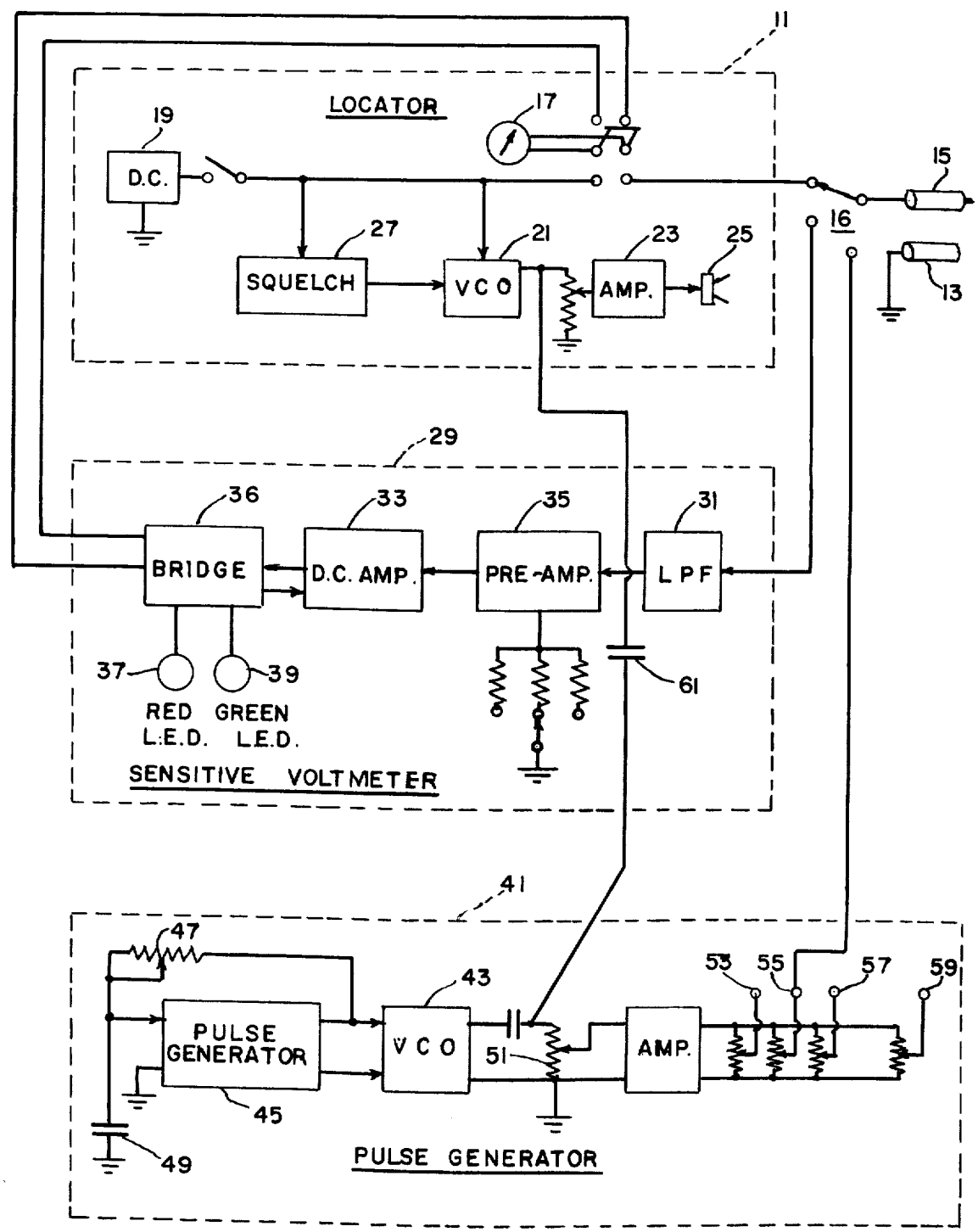
FIG. 1 illustrates, in diagrammatic form, the general content of an instrument according to a preferred embodiment of the invention.

Referring now to FIG. 1, the dotted rectangle 11 indicates the Locator which functions as an impedance indicator for the identification of sensitive spots. The subject holds a body-contacting or reference electrode 13 in his hand, for example, while a probe electrode 15 is moved by the physician over surface areas of the skin. The probe is connected through a microammeter 17 to a source of d.c. voltage 19. In order to simplify its use, the Locator is provided with a voltage-controlled oscillator (VCO) 21, the function of which is to generate the audio tone, the frequency of which is a function of the value of the impedance of the subject under test, i.e., the impedance between the probe and the reference electrode. Preferably, a low audio tone indicates a low impedance. An amplifier 23 and loudspeaker 25 provide audio sound at the desired level.

I have noted that it is very annoying to the physician and to the patient when the tone is continuous, that is, when it remains on all the time, particularly at the high pitch indicative of a high impedance. Accordingly, a squelch circuit 27 has been provided which can be set to trigger the tone generator on only when a relatively low impedance is presented to the probe. The frequency of the tone then indicates the relative impedance so that the location of minimum impedance can be found by listening to the tone. The operator can watch the probe and need not keep his eyes fixed on the meter. The value of the low impedance point can then be determined by recording the meter reading from the scale of the microammeter. When the probe is removed, the tone generator is disabled and the tone stops. The manner in which this may be accomplished is shown in detail in FIG. 2, by way of example.

Once the point has been located, the instrument may be switched by means of Selector Switch 16 to the voltage mode without moving the probe, so that measurements of the exact spot which has been located can now be made of its voltage. This is accomplished by switching to the voltmeter represented by the dotted rectangle 29. The voltmeter also has a number of novel and useful features that facilitate the purpose for which the apparatus was designed.

The probe is now connected to the voltmeter by Swtich 16 through a low-pass filter 31 to minimize undesired signals. Stability and sensitivity are achieved by the use of a stable d.c. amplifier 33. If desired, a preamplifier 35, having a selectable sensitivity range switch, may be used to bring the signal level to a desired value. By suitable switching, the same microammeter 17 is used in a bridge circuit 36 connected to the amplifier feedback circuit in such a way that the meter will be deflected in the same direction regardless of the polarity of the voltage being measured. This feature avoids the need for a zero-center meter which is normally used when voltages of either polarity are to be indicated. Alternatively, a manual switch may be used to reverse the meter. Preferably, the polarity of the signal is indicated visually by a novel circuit illustrated diagrammatically in FIG. 1 by the Red and Green indicator lights 37 and 39, respectively. Preferably, these lights are Light Emitting Diodes (LEDs). They are so connected that one lights when the voltage of the surface under investigation is positive and the other lights when it is negative. The operator, therefore, can instantly tell the polarity. Further. the elimination of the need for a zero-center meter to indicate polarity makes it feasible to use the same meter that is used for the Locator, by suitable switching.

Having located the sensitive point and investigated its voltage characteristics, the operator may now wish to apply electrical pulses to the selected point.

There is reason to believe that the wave-form of the pulses may have a bearing on the results achieved. Pulses of various amplitudes and frequency have been proposed heretofore. Pulse generators described at the Acupuncture Research Conference referred to above have employed, in one mode, pulses variable from 0.25 to 50 pulses per second and of variable amplitude. In another mode, pulse trains are generated, the basic repetition rate within each train being 60/sec. In a further mode, each train may have a slow rising phase and an abrupt cutoff, or a slow rise and a slow decay. The present apparatus has been designed to provide bursts of sine waves variable from 50 hertz to 100 kilohertz, the burst repetition rate being variable from 30 to 200 pulses per minute.

Referring again to FIG. 1, the dotted block 41 is the Pulse Generator. Its basic element is another Voltage Controlled Oscillator. This unit is capable of producing sine, square, triangular, sawtooth, or pulse wave-forms of high accuracy. The signal output (or repetition rate) can be selected over a wide range of frequencies by the application of suitable control voltages. It may be pulsed on and off at a lower frequency by a control voltage produced, for example, by a generator of variable frequency and duty-cycle pulses, indicated as pulse generator 45. The frequency of the pulse trains can be controlled by a timing circuit consisting of variable resistor 47 and capacitor 49. The result is to produce at the VCO output a series of wave trains or bursts of energy recurring at a rate set by resistor 47, each train containing a series of waves at the frequency of the VCO 43. These pulses are amplified and applied to the output probe in an amplitude controlled by variable resistor 51.

It has also been found to be desirable to apply pulses to more than one electrode at the same time. Accordingly, the apparatus is provided with a plurality of output terminals 53, 55, 57, and 59, for example, which may be connected to additional probes, not shown. Each output terminal has means for adjusting its output level independently. The VCO output is coupled by a capacitor 61 to the input of amplifier 23 to provide audio indication of the pulse output of the VCO.

Figure 2:
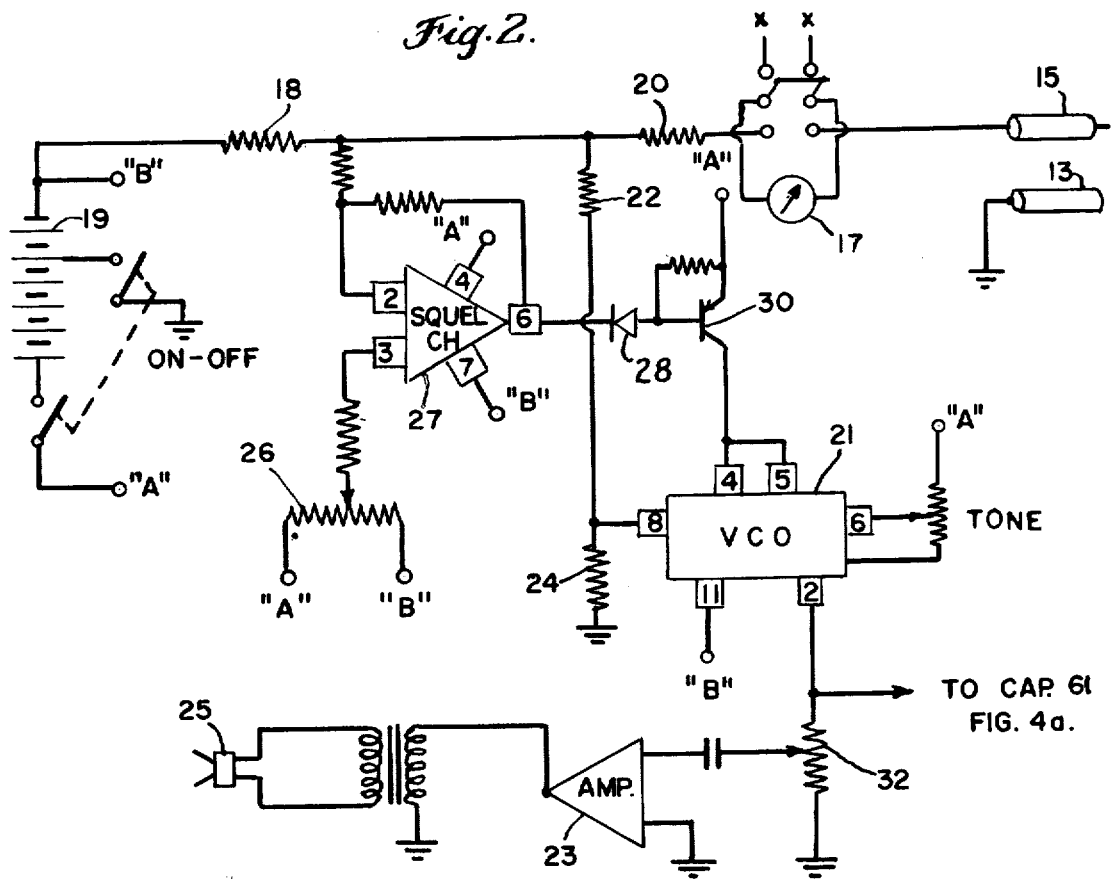
FIG. 2 is the circuit diagram of the Locator 11, shown diagrammatically in FIG. 1.

FIG. 2 shows the Locator circuit in somewhat greater detail. Corresponding reference numerals identify corresponding parts in both figures.

The basic impedance-sensing circuit includes the probe 15, meter 17, battery 19, and two resistors 18 and 20 connected in series. The VCO 21 may be, for example, a Type 8038 "Precision Wave-form Generator/Voltage Controlled Oscillator Integrated Circuit Chip" manufactured by Intersil Inc., of 10900 North Tantau Avenue, Cupertino, California. As indicated above, VCO 21 generates an audio tone the frequency of which is a function of the impedance applied to the probe. The way this is done is as follows: The probe current produces a voltage at the common point between resistors 18 and 20. A suitable portion of this voltage is developed by resistors 22 and 24 and is applied to terminal No. 8 of the VCO chip, which is the "FM sweep input terminal." Thus, the frequency of the tone is controlled by the voltage resulting from changes in load impedance.

The squelch circuit includes an FET input operational amplifier chip such as Type 8007C, also manufactured by Intersil Inc. Its Inverting Input Terminal No. 2 is connected to the same sensing point between resistors 18 and 20. Its Non-Inverting Input is Terminal No. 3 connected to an adjustable source of d.c. reference voltage, obtained across potentiometer 26, across which a source of d.c. voltage is connected. The output Terminal No. 6 feeds the "Duty Cycle Frequency Adjust" Terminals No. 4 and No. 5 of the VCO via an isolating diode 28 and transistor 30. The diode 28 prevents the undesired application of a positive voltage to the base of transistor 30 when the impedance across the load is high, that is, when the probe is not in use. At that time, a certain negative voltage exists at Inverting Terminal No. 2 and a positive voltage is therefore applied to the cathode of diode 28 so that it does not conduct. Transistor 30 is cut off by its base-emitter resistor and the VCO is therefore disabled. Probe current causes the input voltage to the squelch circuit to move in the positive direction. When it reaches a voltage level determined by the setting of potentiometer 26, the Non-Inverting Input or Terminal No. 3 takes over and causes the voltage applied to the diode 28 to go negative, causing it to conduct. This changes the voltage applied to the transistor 30, turning it and the VCO on. Thus, no audio tone is produced until a predetermined level of impedance appears across the probe, the level being selected by potentiometer 26. The tone is applied through a volume control potentiometer 32 to the audio amplifier 23 and the speaker 25.

Figure 3:
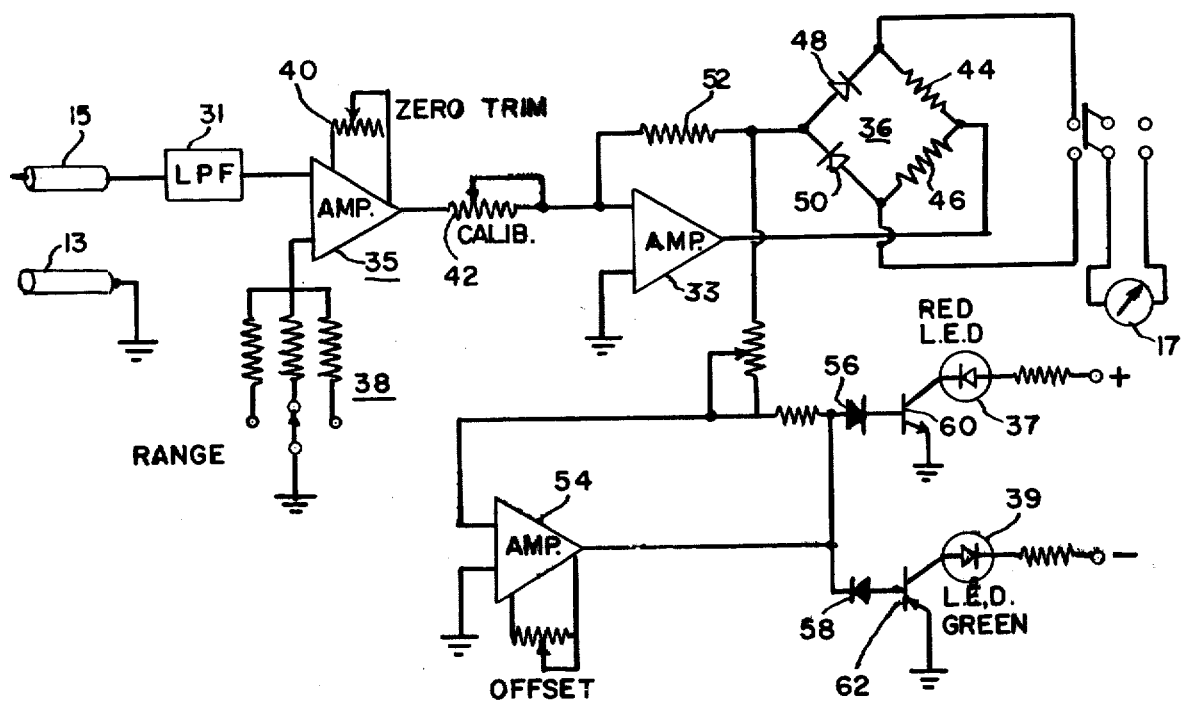
FIG. 3 is a circuit diagram of Sensitive Voltmeter 29, shown diagrammatically in FIG. 1.

Referring now to FIG. 3, I have shown in greater detail the components of the Sensitive Voltmeter having the features described earlier. The probe 15 is connected through Low Pass Filter 31 to a d.c. preamplifier 35 which may be provided with range selecting resistors 38, a zero trim control 40, and a calibration adjustment 42, all in accordance with conventional practice. The output amplifier 33 includes a bridge circuit 36 in its feedback path comprising the two resistors 44 and 46 and the two diodes 48 and 50, poled as indicated. The feedback current flows through resistor 44, diode 48 and resistor 52, or through resistor 46, diode 50 and resistor 52, depending on the polarity of the output voltage. In either case, however, a voltage of a given polarity exists between the conjugate terminals of the bridge to which the microammeter 17 is connected, so that its deflection is always in the same direction regardless of the polarity of the input.

The polarity of the output, however, is sensed at the mid-point of the two diodes and is applied through amplifier 54 and a pair of oppositely-poled diodes 56 and 58 to the respective Light Emitting Diodes 37 and 39 via transistors 60 and 62. Thus, when the output goes positive, the Red LED 37 is turned on and when it is negative, the Green LED 39 is turned on.

Figure 4A:
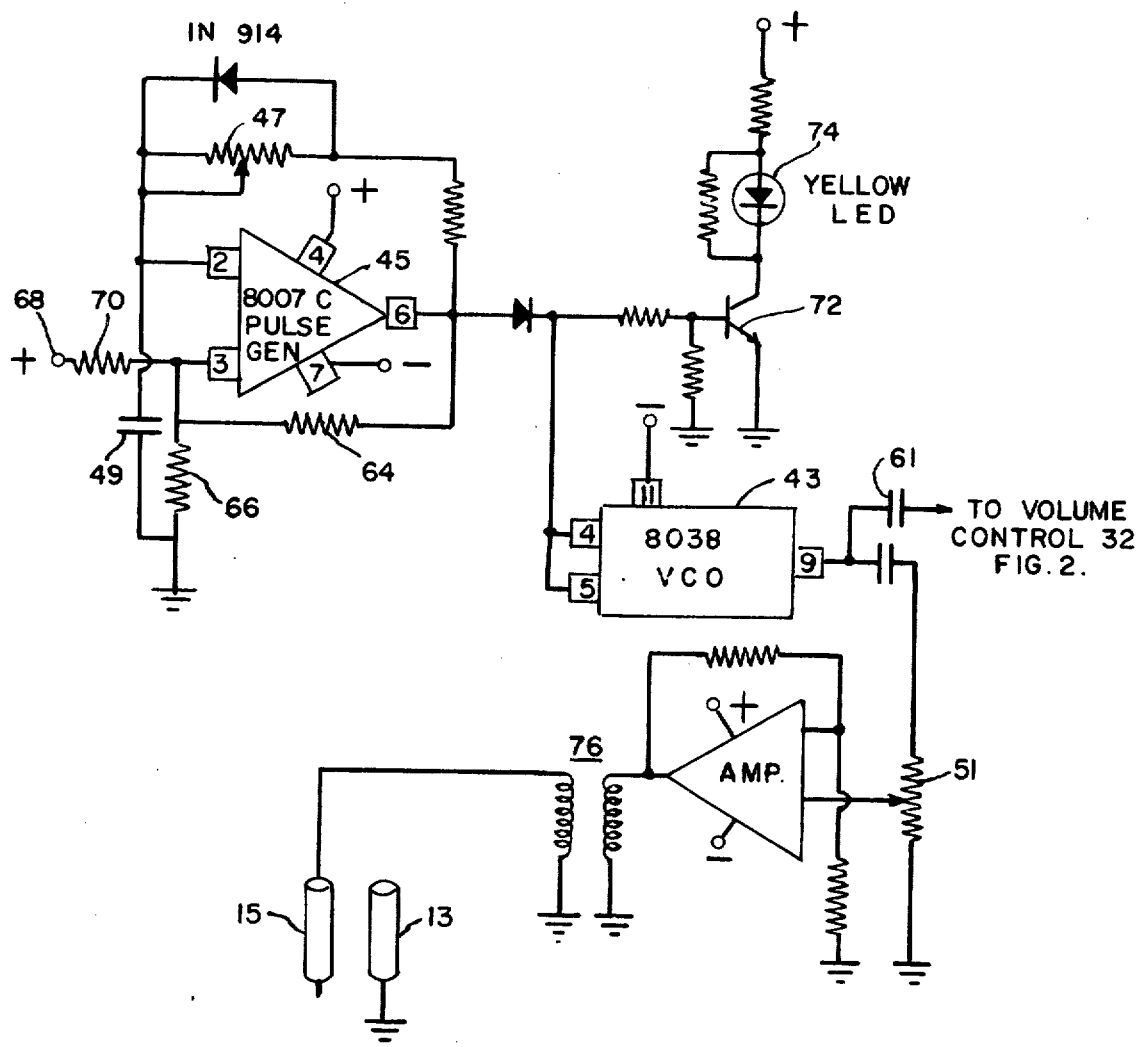
FIG. 4a is a circuit diagram of the Tone Generator 41, also shown diagrammatically in FIG. 1.

FIG. 4a is the circuit diagram of a Pulse Generator according to a preferred embodiment of this invention. Its principle components are another Type 8038 VCO, 43, and the pulse generator 45 that controls its output, which is another Operational Amplifier Integrated Circuit, Type 8007C; the same type of unit that is used in the squelch circuit of FIG. 1. The pulse circuit is well known, per se, and is described in detail in the National Semiconductor Corporation handbook entitled "Linear Applications", dated February 1973, at page AN7-1–6, FIG. 13. Its output Terminal No. 6 is connected to a feedback timing circuit including resistor 47 and capacitor 49, the mid-point of which is connected to the Inverting Input Terminal No. 2. The on-off rate of the amplifier is controlled by this timing circuit under control of the variable resistor 47, and may be set to any desired value. The function of the shunt diode is to advance the shut-off time by changing the RC time constant when the output voltage reaches a positive value. A second feedback circuit including resistors 64 and 66 provides feedback to the Non-Inverting Input Terminal No. 3, which is also connected to a source of reference potential 68 through resistor 70.

Figure 4B:
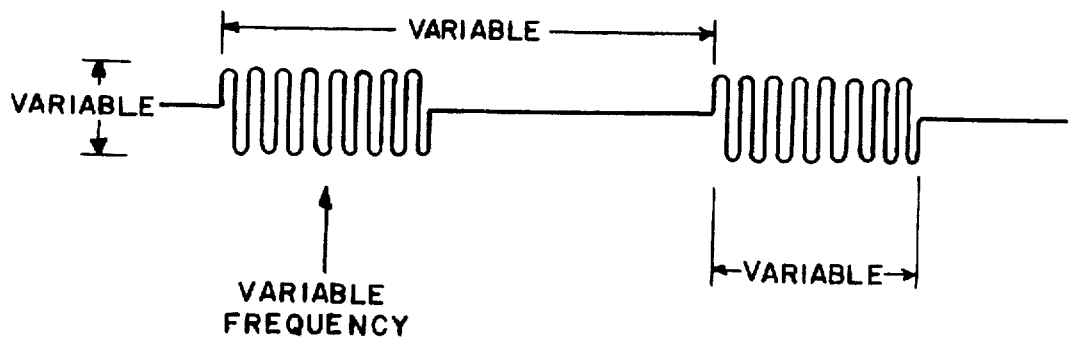
FIG. 4b is a representation of the pulse output of the Tone Generator.

The pulses from the square wave generator are applied through a protecting diode to the Duty Cycle Frequency Adjust Terminals No. 4 and No. 5 of the Type 8038 VCO, 43, as described above. At the same time, the pulse is applied to a transistor 72 to control a Light Emitting Diode (LED) 74 so that the on-off periods of the square wave generator can be observed. The output bursts of sine waves are applied to the amplitude control 51, amplified, if desired, to achieve the necessary voltage level, and applied to the probe electrode, or several of them as described in connection with FIG. 1 through transformer 76. The pulsed tone from VCO 43 is also applied, through capacitor 61, to the volume control 32, FIG. 2, so that an audio indication of the pulse is provided when desired. FIG. 4b illustrates the nature of the pulses generated by the tone generator. is well known, per se, and is described in detail in the National Semiconductor Corporation handbook entitled Linear Applications, dated February 1973, at page AN71–6, FIG. 13. Its output Terminal No 6 is connected to a feedback timing circuit including resistor 47 and capacitor 49, the mid-point of which is connected to the Inverting Input Terminal No. 2. The on-off rate of the amplifier is controlled by this timing circuit under control of the variable resistor 47, and may be set to any desired value. The function of the shunt diode is to advance the shut-off time by changing the RC time constant when the output voltage reaches a positive value. A second feedback circuit including resistors 64 and 66 provides feedback to the Non-Inverting Input Terminal No. 3, which is also connected to a source of reference potential 68 through resistor 70.

The pulses from the square wave generator are applied through a protecting diode to the Duty Cycle Frequency Adjust Terminals No. 4 and No. 5 of the Type 8038 VCO, 43, as described above. At the same time, the pulse is applied to a transistor 72 to control a Light Emitting Diode (LED) 74 so that the on-off periods of the square wave generator can be observed. The output bursts of sine waves are applied to the amplitude control 51, amplified, if desired, to achieve the necessary voltage level, and applied to the probe electrode, or several of them as described in connection with FIG. 1 through transformer 76. The pulsed tone from VCO 43 is also applied, through capacitor 61, to the volume control 32, FIG. 2, so that an audio indication of the pulse is provided when desired. FIG. 4b illustrates the nature of the pulse generated by the tone generator.

I claim:

1. Instrument for determining transcutaneous points of minimum impedance comprising a probe electrode and a common body electrode, means for applying a direct voltage between said electrodes to establish a current the amplitude of which is a function of the impedance between said electrodes, means for generating an audio tone the frequency of which varies continuously as a function of the value of the amplitude of said current and thus of the impedance betweeen said electrodes and squelch means operative to disable said tone generator when the value of said impedance exceeds a predetermined value.

2. An instrument according to claim 1 in which said squelch means includes an operational amplifier having two input terminals and an output terminal, means for applying to one of said two input terminals a voltage proportional to said current, means for applying a reference voltage of selectable amplitude to the other of said two input terminals, the voltage appearing at said output terminal being determined by the relative amplitudes of the two voltages applied to the respective input terminals, and means for utilizing said voltage appearing at said output terminal to disable said tone generator.

3. Instrument for transcutaneous and subcutaneous investigation and treatment comprising a probe electrode and a common body electrode, means for applying a d.c. voltage between said probe and common body electrodes, means for visually indicating the relative impedance of a portion of the human body when said electrodes are placed in contact with said body at selected positions thereon; means for generating an audible tone the frequency of which is a function of the amplitude of the probe current flowing between said probe electrodes whereby points of minimum impedance may be visually and aurally located by moving said probe electrode over the surface of said body; squelch means responsive to probe currents which have less than a selected minimum amplitude for disabling said audible tone generating means when the impedance between said electrodes exceeds a selectable value; and means for selectively applying treating pulses between said probe and common body electrodes after a point of minimum impedance has been located without moving said probe electrode from said point, said last-named means including a pulse generator for producing variable frequency and duty-cycle pulses, an oscillator for producing electrical oscillations of selectable frequency and amplitude, said oscillator being under the on-off control of said pulse generator so as to apply bursts of said oscillations of selectable duration and spacing between said electrodes during said treatment.

4. An instrument according to claim 3 in which said oscillation generator produces oscillations having an amplitude symmetrical above and below the reference potential of said common electrode.

* * * * *